(12) United States Patent
Matsuda et al.

(10) Patent No.: US 12,506,180 B2
(45) Date of Patent: Dec. 23, 2025

(54) METHOD FOR PRODUCING POSITIVE ELECTRODE PLATE FOR NONAQUEOUS ELECTROLYTE SECONDARY BATTERY AND METHOD FOR PRODUCING NONAQUEOUS ELECTROLYTE SECONDARY BATTERY

(71) Applicant: SANYO Electric Co., Ltd., Kadoma (JP)

(72) Inventors: Tetsuya Matsuda, Hyogo (JP); Haruya Nakai, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 623 days.

(21) Appl. No.: 17/914,986

(22) PCT Filed: Feb. 8, 2021

(86) PCT No.: PCT/JP2021/004635
§ 371 (c)(1),
(2) Date: Sep. 27, 2022

(87) PCT Pub. No.: WO2021/199684
PCT Pub. Date: Oct. 7, 2021

(65) Prior Publication Data
US 2023/0111688 A1     Apr. 13, 2023

(30) Foreign Application Priority Data
Mar. 30, 2020  (JP) .................................. 2020-059522

(51) Int. Cl.
*H01M 10/0587* (2010.01)
*H01M 10/0525* (2010.01)
*H01M 4/02* (2006.01)

(52) U.S. Cl.
CPC ... *H01M 10/0587* (2013.01); *H01M 10/0525* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| 2013/0048340 A1 | 2/2013 | Bando et al. |
| 2014/0011064 A1 | 1/2014 | Matsuda et al. |

(Continued)

FOREIGN PATENT DOCUMENTS

| CN | 106654149 A | 5/2017 |
| JP | 2002-015721 A | 1/2002 |

(Continued)

OTHER PUBLICATIONS

International Search Report dated Apr. 27, 2021, issued in counterpart International application No. PCT/JP2021/004635, with English translation. (5 pages).

(Continued)

*Primary Examiner* — Wyatt P McConnell
(74) *Attorney, Agent, or Firm* — WHDA, LLP

(57) ABSTRACT

A manufacturing method of a positive electrode plate for a non-aqueous electrolyte secondary battery includes a coating and drying step of coating a positive electrode active material layer and a protective layer onto a positive electrode core so that the protective layer forms a raised part between a portion inside a side end of a core exposed part in a width direction and a width-direction center, and then drying the positive electrode active material layer and the protective layer; and a compressing step of compressing the protective layer and the positive electrode active material (Continued)

layer so as to press the raised part formed in the coating and drying step and the positive electrode active material layer.

4 Claims, 6 Drawing Sheets

(56) References Cited

U.S. PATENT DOCUMENTS

| | | | |
|---|---|---|---|
| 2016/0043373 A1* | 2/2016 | Arishima | H01M 50/46 429/246 |
| 2017/0125790 A1 | 5/2017 | Fukunaga et al. | |
| 2017/0125791 A1 | 5/2017 | Fukunaga et al. | |
| 2022/0140308 A1 | 5/2022 | Nishida et al. | |

FOREIGN PATENT DOCUMENTS

| | | |
|---|---|---|
| JP | 2013-51035 A | 3/2013 |
| JP | 2017-084696 A | 5/2017 |
| JP | 2017-084697 A | 5/2017 |
| JP | 2017-188371 A | 10/2017 |
| JP | 2018-092707 A | 6/2018 |
| JP | 6336821 B2 | 6/2018 |
| WO | 2012/128160 A1 | 9/2012 |
| WO | 2017/174374 A1 | 10/2017 |
| WO | 2020/170543 A1 | 8/2020 |

OTHER PUBLICATIONS

Office Action dated Mar. 15, 2025, issued in counterpart CN Application No. 202180025001.X. with partial English translation. (9 pages).

* cited by examiner

METHOD FOR PRODUCING POSITIVE ELECTRODE PLATE FOR NONAQUEOUS ELECTROLYTE SECONDARY BATTERY AND METHOD FOR PRODUCING NONAQUEOUS ELECTROLYTE SECONDARY BATTERY

CROSS-REFERENCE TO RELATED APPLICATIONS

This application is a national stage of International Application No. PCT/JP2021/004635, filed Feb. 8, 2021, which claims priority to Japanese Patent Application No. 2020-059522 filed Mar. 30, 2020 both of which are hereby incorporated by reference in their entirety.

TECHNICAL FIELD

The present disclosure relates to a manufacturing method of a positive electrode plate for a non-aqueous electrolyte secondary battery, and a manufacturing method of the non-aqueous electrolyte secondary battery.

BACKGROUND ART

In recent years, non-aqueous electrolyte secondary batteries represented by lithium-ion batteries have widely been used as secondary batteries that implement high power output and high energy density. The non-aqueous electrolyte secondary batteries have an electrode assembly formed by laminating a positive electrode plate and a negative electrode plate through a separator.

Patent Literature 1 discloses a positive electrode plate of a non-aqueous electrolyte secondary battery. The positive electrode plate includes a metal foil, and an active material layer and an insulating layer formed on the surface of the metal foil. A portion along an edge part of the metal foil is defined as an active material non-forming part. The insulating layer is formed on the active material non-forming part. The thickness of the insulation layer gradually decreases from the position adjacent to the active material layer toward a core exposed part. The core exposed part of the insulating layer has a side end part formed in a circular arc shape in cross section that gradually approaches the surface of the core exposed part.

Patent Literature 2 discloses an insulator coated on a core in a positive electrode plate of a secondary battery. The insulator is made to have a thickness identical to or larger than the thickness of a dried positive electrode mixture layer after a coating and drying step of the insulator and before press working of the insulator. The positive electrode mixture layer and the insulator are then heat-pressed by press working. In this case, the thickness of the insulator is gradually decreased toward the side end of a core exposed part.

CITATION LIST

Patent Literature

PATENT LITERATURE 1: Japanese Unexamined Patent Application Publication No. 2017-188371
PATENT LITERATURE 2: U.S. Pat. No. 6,336,821

SUMMARY

In some positive electrode plates for secondary batteries, a protective layer is formed in a region adjacent to a positive electrode active material layer on at least one surface of a positive electrode core. The protective layer is, for example, a porous layer. On the other hand, a packing density of the positive electrode active material layer needs to be increased in order to increase the capacity and power output of the secondary batteries. With the increase in packing density, a portion of the positive electrode core where the positive electrode active material layer is provided is pressed in a plate thickness direction and expands. In this case, a core exposed part of the positive electrode core without the positive electrode active material is not pressed in the plate thickness direction, and so the core exposed part less expands. This causes an expansion difference between the portion of the positive electrode core where the positive electrode active material layer is provided and the positive electrode core exposed part. Therefore, when the positive electrode active material layer is compressed, wrinkles may undesirably be generated in the positive electrode core exposed part, or when a winding type electrode assembly is produced by laminating a positive electrode plate, a negative electrode plate and a separator, winding displacement of the positive electrode plate may undesirably occur during a winding step of the electrode assembly.

A manufacturing method of a positive electrode plate for a non-aqueous electrolyte secondary battery in one aspect of the present disclosure is a manufacturing method of a positive electrode plate for a non-aqueous electrolyte secondary battery having a body part that has a positive electrode active material layer formed on a positive electrode core, and a core exposed part that has the positive electrode core exposed without the positive electrode active material layer formed on the positive electrode core. The positive electrode plate for a non-aqueous electrolyte secondary battery has a protective layer formed in a region of the core exposed part that is adjacent to the positive electrode active material layer. The manufacturing method comprises: a coating and drying step of coating the positive electrode active material layer and the protective layer onto the positive electrode core so that the protective layer forms a raised part between a portion inside a side end of the core exposed part in a width direction and a width-direction center, and then drying the positive electrode active material layer and the protective layer; and a compressing step of compressing the protective layer and the positive electrode active material layer so as to press the raised part formed in the coating and drying step and the positive electrode active material layer.

A manufacturing method of a non-aqueous electrolyte secondary battery in one aspect of the present disclosure comprises: an electrode assembly producing step of producing an electrode assembly including the positive electrode plate for a non-aqueous electrolyte secondary battery manufactured with the manufacturing method of the positive electrode plate for a non-aqueous electrolyte secondary battery of the present disclosure, a negative electrode plate, and a separator; and an arranging step of arranging the electrode assembly and a non-aqueous electrolyte in an outer casing.

According to the manufacturing method of a positive electrode plate for a non-aqueous electrolyte secondary battery and the manufacturing method of a non-aqueous electrolyte secondary battery in an aspect of the present disclosure, it is possible to prevent generation of wrinkles in the positive electrode plate and to prevent winding displace-

DESCRIPTION OF EMBODIMENTS

As a result of careful studies to solve the above issues, the inventor of the present invention has found out a manufacturing method of a positive electrode plate for a non-aqueous electrolyte secondary battery having a body part that has a positive electrode active material layer formed on a positive electrode core, and a core exposed part that has the positive electrode core exposed without the positive electrode active material layer formed on the positive electrode core. The positive electrode plate for a non-aqueous electrolyte secondary battery has a protective layer formed in a region of the core exposed part that is adjacent to the positive electrode active material layer. The manufacturing method comprises: a coating and drying step of coating the positive electrode active material layer and the protective layer onto the positive electrode core so that the protective layer forms a raised part between a portion inside a side end of the core exposed part in a width direction and a width-direction center, and then drying the positive electrode active material layer and the protective layer; and a compressing step of compressing the protective layer and the positive electrode active material layer so as to press the raised part formed in the coating and drying step and the positive electrode active material layer. The manufacturing method can prevent generation of wrinkles in the positive electrode plate and to prevent winding displacement of the positive electrode plate in the case of forming a winding type electrode assembly. This will be described below in detail.

Hereinafter, an example of the embodiment of the present disclosure will be described in detail. In the following descriptions, specific shapes, materials, directions, numerical values, etc. are merely examples for easy understanding of the present disclosure, and therefore they can appropriately be changed in matching with applications, purposes, specifications, etc. Hereinafter, description is given of a square battery having a winding type electrode assembly housed in an outer casing that is a square metal case.

(Configuration of Secondary Battery)

Figure 1:
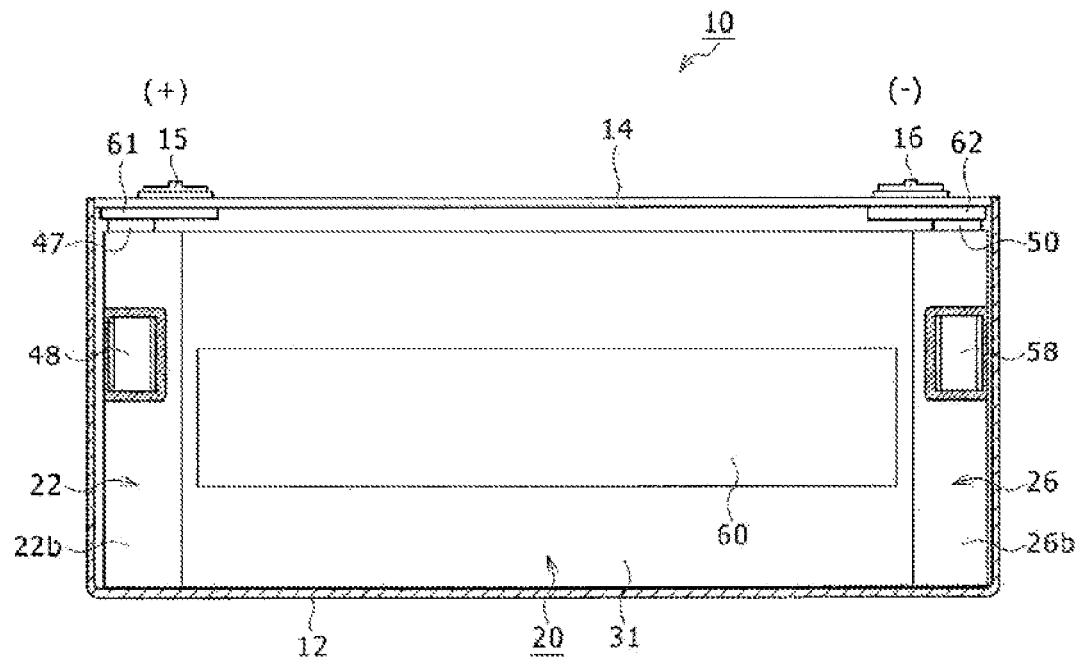
FIG. 1 is a sectional view of a non-aqueous electrolyte secondary battery as an example of an embodiment.
Figure 2:
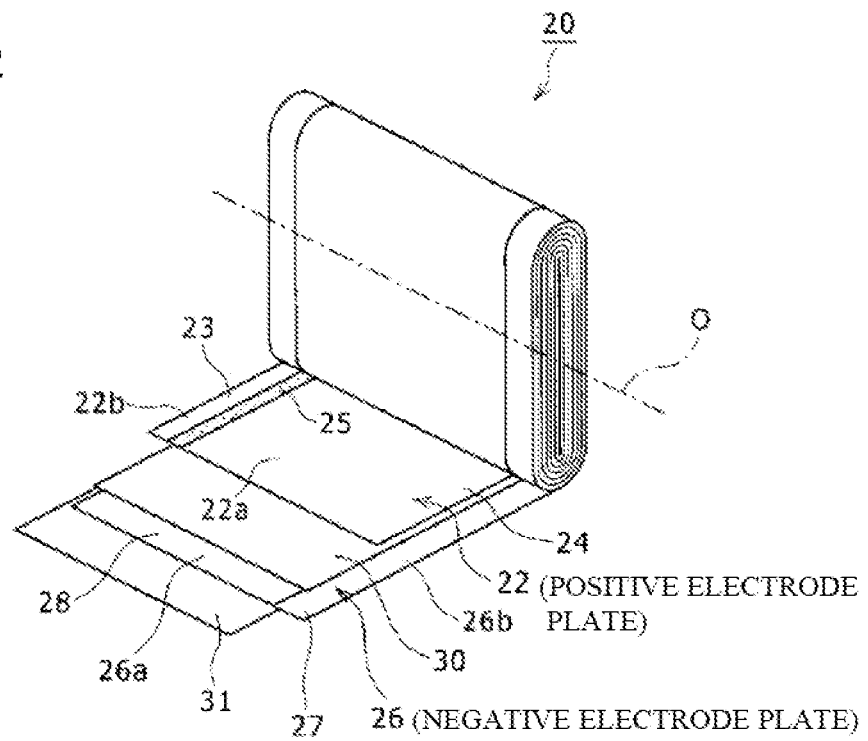
FIG. 2 is a perspective view showing a winding type electrode assembly that constitutes the non-aqueous electrolyte secondary battery in FIG. 1 with a winding end part being developed.

First, FIGS. 1 and 2 are used to describe the configuration of a non-aqueous electrolyte secondary battery 10 manufactured using a manufacturing method of the embodiment. FIG. 1 is a sectional view of the non-aqueous electrolyte secondary battery 10. FIG. 2 is a perspective view showing a winding type electrode assembly 20 that constitutes the non-aqueous electrolyte secondary battery 10, with a winding end part being developed. The non-aqueous electrolyte secondary battery 10 is stated below as a secondary battery 10.

The secondary battery 10 comprises an outer casing 12 as a case and a winding type electrode assembly 20 arranged inside the outer casing 12. Inside the outer casing 12, a non-aqueous electrolytic solution equivalent to the non-aqueous electrolyte is housed. The non-aqueous electrolytic solution is, for example, an electrolytic solution containing lithium salt and having lithium ion conductivity.

As shown in FIG. 2, the electrode assembly 20 is a winding structure where a winding axis O extends in a longitudinal direction of the secondary battery 10. The electrode assembly 20 has a flat shape in which a positive electrode plate 22 and a negative electrode plate 26 are wound via separators 30 and 31. The electrode assembly 20 is, for example, formed by winding a long-length positive electrode plate 22, a long-length separator 30, a long-length negative electrode plate 26, a long-length separator 31 in a laminated state, with the separator 31 arranged on the outermost circumference.

As shown in FIG. 1, the metal outer casing 12 is in a box shape with an opening at its top end, and the secondary battery 10 comprises a seal plate 14 to block the opening. The outer casing 12 and the seal plate 14 can be made of aluminum or aluminum alloy. On the seal plate 14, a positive electrode terminal 15 protrudes from a one end part in a longitudinal direction (a left end part in FIG. 1), and a negative electrode terminal 16 protrudes from another end part in the longitudinal direction (a right end part in FIG. 1). The positive electrode terminal 15 and the negative electrode terminal 16 are fixed and attached to the seal plate 14 via a plastic gasket in the state of being inserted into respective two holes formed in the seal plate 14. The winding axis of the electrode assembly 20 is parallel to the longitudinal direction of the seal plate 14 (a right-left direction in FIG. 1). Insulation between the electrode assembly 20 and the outer casing 12 may be implemented by providing inside the outer casing 12 an insulating sheet folded in a box shape.

(Positive Electrode Plate)

The positive electrode plate 22 has a positive electrode core 23, and a positive electrode active material layer 24 that is formed on both the surfaces of the positive electrode core 23 and includes a positive electrode active material. As the positive electrode core 23, a metal foil that is stable in a potential range of the positive electrode, such as aluminum, and aluminum alloy, a film with the metal arranged on its surface layer, etc., may be used. As the positive electrode active material, lithium-transition metal oxides that allow insertion and removal of lithium ions, can be used. The positive electrode active material layer 24 may preferably include a binder and a conductive agent in addition to the positive electrode active material. The positive electrode plate 22 has a body part 22a having the positive electrode active material layer 24 formed on the positive electrode core 23, and a positive electrode core exposed part 22b having the positive electrode core 23 exposed without the positive electrode active material layer formed on the positive electrode core 23. The positive electrode core exposed part 22b is formed in a width-directional one end part of the positive electrode plate 22 in a pre-winding state. The positive electrode plate 22 further has a protective layer 25 formed along the longitudinal direction in a region of the positive electrode core exposed part 22b that is adjacent to the positive electrode active material layer 24. In FIG. 2, the protective layer 25 is shown by a sand part. The protective layer 25 is, for example, a porous layer, which is thinner than the positive electrode active material layer 24. Hence, the protective layer 25 forms an air path between the separators 30 and 31 by a step formed between the positive electrode core exposed part 22b and the positive electrode active material layer 24. This makes it easier to distribute gases, generated in the positive electrode active material layer 24 during overcharging, to the outside of the electrode assembly 20 through the inside of the protective layer 25. This also allows a pressure-sensitive current interruption mechanism provided in the secondary battery 10 to be activated quickly and reliably before the internal pressure of the battery significantly rises. As a result, safety in the event of overcharging is enhanced.

Examples of the positive electrode active material may include lithium transition metal oxides containing transition metal elements, such as Co, Mn, and Ni. Examples of the lithium transition metal oxides include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, $Li_2MPO_4F$ (at least one of the group consisting of M; Na, Mg, Sc, Y, Mn, Fe, Co, Ni, Cu, Zn, Al, Cr, Pb, Sb, B, $0<x\leq1.2$, $0<y\leq0.9$, $2.0\leq z\leq2.3$). One of the group may be used independently or two or more of the group may be used combinedly. Since the capacity of the secondary battery 10 can be increased, the positive electrode active material preferably includes lithium nickel composite oxides, such as $Li_xNiO_2$, $Li_xCo_yNi_{1-y}O_2$, $Li_xNi_{1-y}M_yO_z$ (at least one of the group consisting of M; Na, Mg, Sc, Y, Mn, Fe, Co, Ni, Cu, Zn, Al, Cr, Pb, Sb, B, $0<x\leq1.2$, $0<y\leq0.9$, $2.0\leq z\leq2.3$).

Examples of conductive materials used for the positive electrode active material layer 24 may include carbon black (CB), acetylene black (AB), ketchen black, carbon nanotubes (CNT), and carbon-based particles such as graphite. These materials may be used independently, or two or more of the group may be used combinedly. Carbon black is preferably used as the conductive material used for the positive electrode active material layer 24.

Examples of the binder used for the positive electrode active material layer 24 may include fluororesin such as polytetrafluoroethylene (PTFE), polyvinylidene fluoride (PVDF), polyacrylonitrile (PAN), polyimide resin, acrylic resin, and polyolefin resin. These materials may be used independently, or two or more of the materials may be used combinedly. Polyvinylidene fluoride is preferably used as the conductive material used for the positive electrode active material layer 24.

The protective layer 25 preferably contains inorganic oxides and a binder. Examples of the inorganic oxides used for the protective layer 25 may include alumina, titania, zirconia, and silica. The binder used for the protective layer 25 may include resin such as polyvinylidene fluoride (PVDF). The protective layer 25 may contain a conductive agent, such as carbon materials. The protective layer 25 preferably has a porosity larger than the porosity of the positive electrode active material layer 24.

The positive electrode plate 22 can be manufactured by the steps below: coating a positive electrode active material layer slurry containing a positive electrode active material, a binder, and a dispersion medium, and a protective layer slurry onto the positive electrode core 23; drying the coated films and removing the dispersion medium; and then compressing the coated films to form the positive electrode active material layer 24 and the protective layer 25 on both the surfaces of the positive electrode core 23.

(Negative Electrode Plate)

The negative electrode plate 26 has a negative electrode core 27, and a negative electrode active material layer 28 that is formed on both the surfaces of the negative electrode core 27 and includes a negative-electrode active material. As the negative electrode core 27, a metal foil that is stable in a potential range of the negative electrode, such as copper, and copper alloy, a film with the metal arranged on its surface layer, etc., may be used. As the negative electrode active material, carbon materials that allow insertion and removal of lithium ions, silicon compounds, etc., can be used. The negative electrode active material layer 28 may preferably include a binder, in addition to the negative electrode active material. The negative electrode plate 26 has a body part 26a formed with the negative electrode active material layer 28 on the negative electrode core 27, and a negative electrode core exposed part 26b having the negative electrode core 27 exposed without the negative electrode active material layer formed on the negative electrode core 27. The negative electrode core exposed part 26b is formed in a width-directional one end part of the negative electrode plate 26 in a pre-winding state.

The negative electrode active material is not particularly limited as long as, for example, lithium ions can be irreversibly absorbed and released. For example, carbon materials such as natural graphite and artificial graphite, metal that alloys with lithium, such as silicon (Si) and tin (Sn), or alloys containing metal elements such as Si and Sn, and composite oxides, can be used. As the negative electrode active material, carbon materials are preferable, and natural graphite is more preferable. The negative electrode active materials may be used independently, or two or more of the materials may be used combinedly.

The negative electrode plate 26 can be manufactured by the steps below: coating a negative electrode active material layer slurry containing a negative electrode active material, a binder, and a dispersion medium, and a protective layer slurry onto the negative electrode core 27; drying the coated films and removing the dispersion medium; and then compressing the coated films to form the negative electrode active material layer 28 on both the surfaces of the negative electrode core 27.

As shown in FIG. 1, in the electrode assembly 20, the positive electrode core exposed part 22b in a wound state is arranged in the one end part (the left end part in FIG. 1) in a winding axis direction (the right-left direction in FIG. 1), which is the direction in which the winding axis extends. At the other end part (the right end part in FIG. 1) of the electrode assembly 20 in the winding axis direction, the negative electrode core exposed part 26b in a wound state is placed.

(Separator)

The separator 30 in the wound state is arranged between the positive electrode plate 22 and the negative electrode plate 26 to electrically separate the positive electrode plate 22 and the negative electrode plate 26. The separator 31 arranged on the outermost circumference prevents a short circuit between the negative electrode plate 26, which is the electrode of the outermost layer, and external members.

As each of the separators 30 and 31, a porous sheet with ion permeability and insulation properties is used. Specific examples of the porous sheet may include microporous thin films, woven fabrics, and non-woven fabrics. As the materials of the separators 30 and 31, olefin resin such as polyethylene and polypropylene, and cellulose are suitable. The separators 30 and 31 may be laminates having a cellulose fiber layer, and a thermoplastic resin fiber layer such as olefin resin. Each of the separators 30 and 31 may be a multi-layer separator containing a polyethylene layer and a polypropylene layer. The separators 30 and 31 may also be the separators on the surface of which a material such as aramid resin and ceramic is coated. For example, each of the separators 30 and 31 may be a three-layer separator including a polyethylene layer, a polypropylene layer, and a polyethylene layer.

In the electrode assembly 20, an insulating tape 60 (FIG. 1) is attached to one side surface of the electrode assembly 20 in a thickness direction, so that a winding end-side end part of the separator 31 arranged on the outermost circumference, that is, an end part of the separator 31 on the winding end side, is fixed to an outer circumference part of the electrode assembly 20.

Moreover, the positive electrode core exposed part 22b in the wound state is electrically connected to a positive electrode current collector 47. Accordingly, the positive electrode current collector 47 is electrically connected to the positive electrode plate 22. The positive electrode current collector 47 is connected integrally with a positive electrode receiving member 48 that is arranged on the opposite side of the electrode assembly 20 in the thickness direction (the front side of the page of FIG. 1), with the positive electrode core exposed part 22b interposed therebetween. The positive electrode current collector 47 is electrically connected to a lower end part of the positive electrode terminal 15, which vertically extends through a first insulating member 61 arranged on an inner surface of the seal plate 14.

The negative electrode core exposed part 26b in the wound state is electrically connected to a negative electrode current collector 50. Accordingly, the negative electrode current collector 50 is electrically connected to the negative electrode plate 26. The negative electrode current collector 50 is connected integrally with a negative electrode receiving member 58 that is arranged on the opposite side of the electrode assembly 20 in the thickness direction (the front side of the page of FIG. 1), with the negative electrode core exposed part 26b interposed therebetween. The negative electrode current collector 50 is electrically connected to a lower end part of the negative electrode terminal 16, which vertically extends through a second insulating member 62 arranged on the inner surface of the seal plate 14.

The outer casing 12 is welded to the seal plate 14 at its opening end part, so that the opening of the outer casing 12 is closed.

(Manufacturing Method of Positive Electrode Plate and Secondary Battery)

Figure 3:
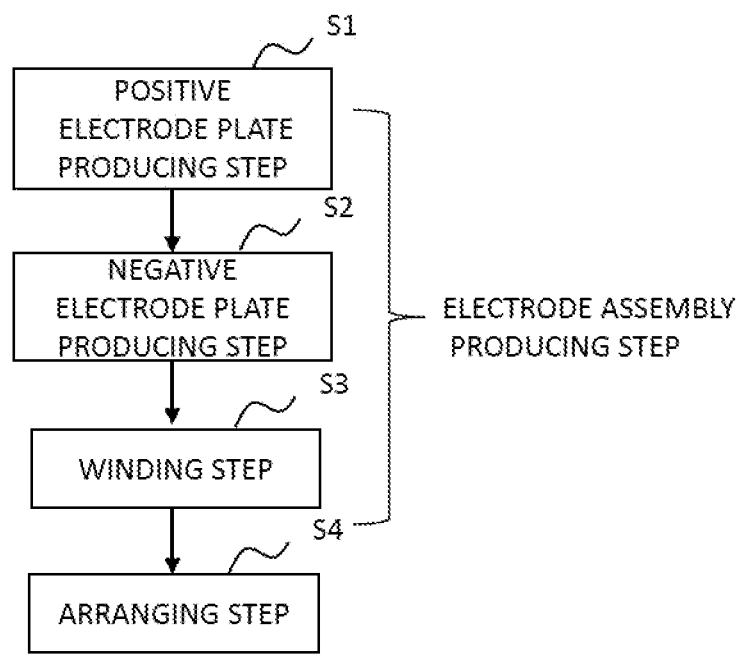
FIG. 3 is a flowchart showing a manufacturing method of a non-aqueous electrolyte secondary battery as an example of the embodiment.

Now, with reference to FIGS. 3 to 9, description is mainly given of a manufacturing method of the secondary battery 10, and more particularly a manufacturing method of the positive electrode plate 22. FIG. 3 is a flowchart showing the manufacturing method of the secondary battery as an example of the embodiment. The manufacturing method of the secondary battery 10 has a positive electrode plate producing step S1, a negative electrode plate producing step S2, a winding step S3, and an arranging step S4. The positive electrode plate producing step S1 is to produce the positive electrode plate 22. The negative electrode plate producing step S2 is to produce the negative electrode plate 26. The winding step S3 produces the electrode assembly 20 by winding the positive electrode plate 22, the negative electrode plate 26, and the separators 30 and 31 in a laminated state. The positive electrode plate producing step S1, the negative electrode plate producing step S2, and the winding step S3 constitute an electrode assembly producing step. In the arranging step S4, the electrode assembly 20 and a non-aqueous electrolyte are arranged inside the outer casing 12, and the seal plate 14 is welded to the opening end part of the outer casing 12. The order of the positive electrode plate producing step S1 and the negative electrode plate producing step S2 may be reversed, or they may be performed at the same time. The positive electrode plate producing step S1 will be described below in detail.

(Positive Electrode Plate Producing Step)

Figure 4:
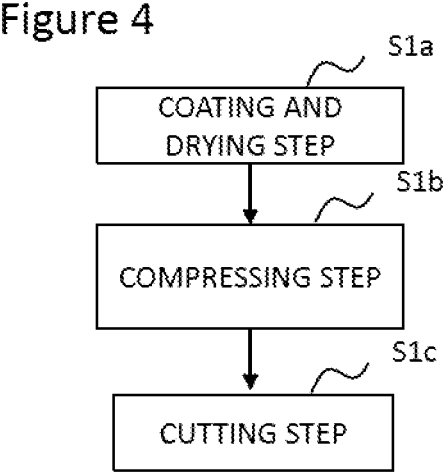
FIG. 4 is a flowchart showing a manufacturing method of a positive electrode plate for a non-aqueous electrolyte secondary battery as an example of the embodiment.
Figure 5:
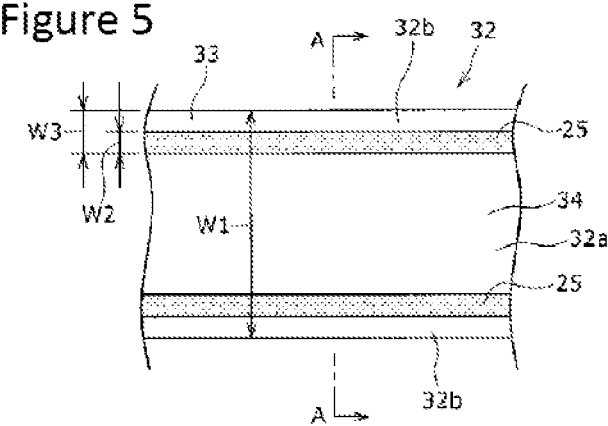
FIG. 5 is a development view of a longitudinal part of a pre-cut positive electrode plate, the pre-cut positive electrode plate forming a positive electrode plate for a non-aqueous electrolyte secondary battery that constitutes the electrode assembly in FIG. 2.
Figure 6:
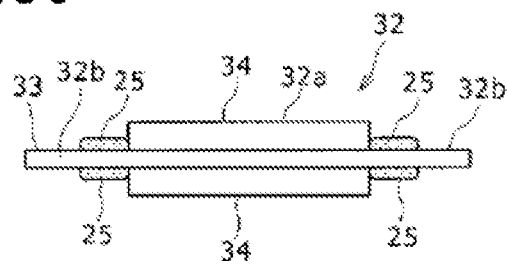
FIG. 6 is a sectional view of FIG. 5 taken along A-A line.

FIG. 4 is a flowchart showing the manufacturing method of the positive electrode plate 22 as an example of the embodiment. The manufacturing method of the positive electrode plate 22 has a coating and drying step S1a, a compressing step S1b, and a cutting step S1c. The manufacturing method of this example is to manufacture two positive electrode plates 22 at the same time. First, a pre-cut positive electrode plate 32 (FIGS. 5 and 6), having a width corresponding to the widths of the two positive electrode plates 22 combined, is manufactured. FIG. 5 is a development view of a longitudinal part of the pre-cut positive electrode plate 32. FIG. 6 is a sectional view of FIG. 5 taken along A-A line. As shown in FIGS. 5 and 6, the coating and drying step S1a and the compressing step S1b shown in FIG. 4 are performed in the state where a positive electrode core exposed part 32b is arranged on each of both end sides of a body part 32a that forms the pre-cut positive electrode plate 32. In the coating and drying step S1a, the positive electrode active material layer 34 and the protective layer 25 are coated onto the positive electrode core 33.

Figure 7:
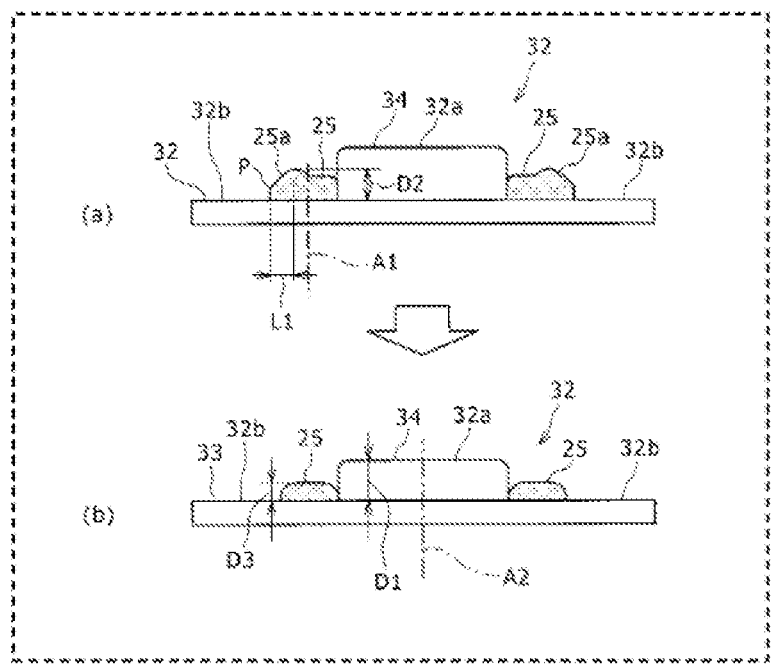
FIG. 7(a) shows the pre-cut positive electrode plate in a state after a coating and drying step and before a compressing step and corresponds to an expanded upper part of FIG. 6 in an example of the embodiment.
FIG. 7(b) shows the pre-cut positive electrode plate in the state after the coating and drying step and after the compressing step and corresponds to the expanded upper part of FIG. 6 in an example of the embodiment.

FIG. 7(a) shows the pre-cut positive electrode plate 32 in the state after the coating and drying step and before the compressing step, and corresponds to an expanded upper part of FIG. 6 in an example of the embodiment. FIG. 7(b) shows the pre-cut positive electrode plate 32 in the state after the coating and drying step and after the compressing step, and corresponds to the expanded upper part of FIG. 6 in an example of the embodiment. In coating the positive electrode active material layer 34 and the protective layer 25, as shown in FIG. 7(a), the protective layers 25 forms a raised part 25a that extends in the longitudinal direction (in a front-back direction of the page of FIG. 7) between a portion inside a core exposed part side end P in the width direction (right-left direction in FIG. 7) and a width-direction center A1. In this case, the width-direction outer end of the raised part 25a positions inside the core exposed part side end P in the width direction. A thickness-direction outer surface extending from the width-direction outer end to the core exposed part side end P may be closer to the side of the positive electrode core 33 than the thickness-direction outer surface that is inside the protective layer 25 in the width direction, or may be a flat surface at the same thickness-direction position as the thickness-direction outer surface that is inside in the width direction. Then, after the coating, the positive electrode active material layer 34 and the protective layers 25 are dried. For example, as a positive electrode active material, a positive electrode active material layer slurry is prepared by mixing lithium-containing metal composite oxides, expressed by $LiNi_{0.35}Co_{0.35}Mn_{0.30}O_2$, carbon black as a conductive material, and polyvinylidene fluoride (PVDF) as a binder. In addition, to form the protective layer 25, a protective layer slurry containing inorganic oxides and a binder is prepared. The positive electrode active material layer slurry and the protective layer slurry are coated on both the surfaces of the positive electrode core 33 by a die-coater. Coating the positive electrode active material layer slurry and the protective layer slurry is equivalent to coating the positive electrode active material layer and the protective layer. For example, a protective layer supply port is provided on an upper part of a die head of the die-coater. The positive electrode active material layer slurry supplied from a positive electrode active material layer supply part, and the protective layer slurry supplied from the protective layer supply port are guided to a discharge port of the die head. With a shim plate provided at the discharge port, the positive electrode active material layer slurry and the protective layer slurry are discharged at different positions on the positive electrode core 33 in the width direction. Then, the positive electrode active material layer slurry is made to be coated on a center part of the positive electrode core 33 in the width direction, and the protective layer slurry is made to be coated on both width-direction ends of a region where the positive electrode active material layer slurry is coated. Furthermore, the protective layer 25 is made thinner than the positive electrode active material layer 34. In addition, in each of the protective layers 25, the raised part 25a is formed between a portion inside the core exposed part side end P in the width direction and the width-direction center A1. For example, on the shim plate, a first opening part for discharging the positive electrode active material layer slurry, and two second opening parts for discharging the protective layer slurry are formed such that the opening end side of the respective discharge ports are open, and one of or both the shape of the second opening parts and a discharge flow rate of each slurry are changed. As a result, a pre-cut positive electrode plate before the drying step is formed, with the raised parts of the protective layer slurry formed at predetermined positions. The pre-cut positive electrode plate is then dried by a drying machine to form the pre-cut positive electrode plate 32 before the compressing step.

Figure 8:
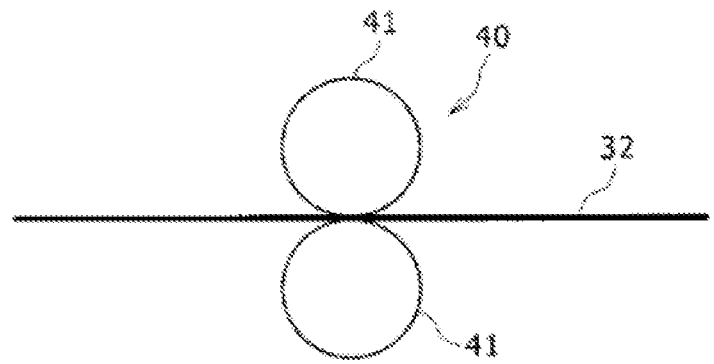
FIG. 8 is a schematic illustration of a press machine used in the compressing step in an example of the embodiment.
Figure 9:
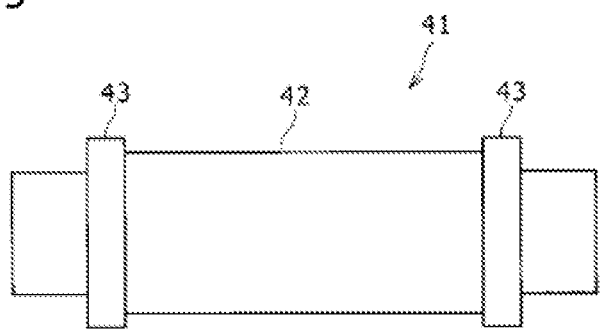
FIG. 9 is a front view of a roller that constitutes the press machine in FIG. 8.

FIG. 8 is a schematic illustration of a press machine 40 used in the compressing step S1b (FIG. 4) in an example of the embodiment. FIG. 9 is a front view of a compression roller 41 that constitutes the press machine 40. The press machine 40 in FIGS. 8 and 9 is used in the compressing step S1b. The press machine 40 includes a pair of opposing compression rollers 41. As shown in FIG. 9, each compression roller in the pair of compression rollers 41 includes an intermediate pressing part 42 that compresses the positive electrode active material layer 34 (FIGS. 5 to 7), and two end pressing parts 43 which are provided on both end sides of the intermediate pressing part 42 and are larger in diameter than the intermediate pressing part 42. The end pressing parts 43 are used to compress the protective layers 25. The pair of compression rollers 41 is arranged such that the respective compression rollers can rotate while facing each other. In the compressing step S1b, the pre-cut positive electrode plate 32 after drying and before the compressing step is passed between the pair of compression rollers 41 to compress the pre-cut positive electrode plate 32. In this case, in the pre-cut positive electrode plate 32, each of the protective layers 25 and each of the positive electrode active material layers 34 are compressed so as to press the raised parts 25a formed in the coating and drying step and the positive electrode active material layers 34. As a result, as shown in FIG. 7(b), the pre-cut positive electrode plate 32 having the body part 32a formed with the positive electrode active material layer 34 on the positive electrode core 33, and the positive electrode core exposed parts 32b having the positive electrode core 33 exposed without the positive electrode active material layers formed on the positive electrode core 33 are manufactured. The pre-cut positive electrode plate 32 has the protective layers 25 formed in a region of the positive electrode core exposed parts 32b that are adjacent to the positive electrode active material layer 34. In the pre-cut positive electrode plate 32 in FIG. 7(b), the raised part 25a of the protective layer 25 (FIG. 7(a)) is compressed so that the thickness-direction outer surface is substantially flat. At this point, the thickness of the protective layer 25 is smaller than the thickness of the positive electrode active material layer 34. Since the pre-cut positive electrode plate 32 is thus manufactured, it is possible to prevent generation of wrinkles in the positive electrode plate 22 and to prevent winding displacement of the positive electrode plate 22 in the case of forming a winding type electrode assembly 20, as will be described later.

In the cutting step S1c (FIG. 4) subsequent to the compressing step S1b, a width-direction center A2 of the body part 32a (FIG. 7(b)) is cut along the longitudinal direction (front-back direction of the page of FIG. 7(b)) to form two positive electrode plates 22 (FIG. 2). For example, the cutting step S1C is performed using a slit machine. The slit machine has two cylindrical bladed rollers having slit blades formed on the outer circumferential surfaces of the rollers, and the two bladed rollers are rotatably arranged at opposing positions. By passing the pre-cut positive electrode plate 32 between the two bladed rollers, the pre-cut positive electrode plate 32 is cut at the width-direction center A2 to manufacture two positive electrode plates 22.

In the winding step, the thus-manufactured positive electrode plate 22, the negative electrode plate 26, and the separators 30 and 31 are wound while being laminated to form a winding type electrode assembly 20 (FIG. 2). Then, through the arranging step S4 (FIG. 3), the secondary battery 10 is manufactured.

Effects

According to the manufacturing method of the positive electrode plate 22 and the secondary battery 10, when the positive electrode active material layer 34 and the protective layers 25 are coated onto the positive electrode core 33, the protective layer 25 has the raised part 25a between a portion inside the core exposed part side end P in the width direction and the width-direction center A1, and then the positive electrode active material layer 34 and the protective layer 25 are dried. After coating and drying, the protective layer 25 and the positive electrode active material layer 34 are compressed so as to press the raised parts 25a and the positive electrode active material layer 34. Thus, the raised part 25a of the protective layer 25 is compressed when the positive electrode active material layer 34 is compressed, so that not only a portion of the positive electrode core 33 where the positive electrode active material layer 34 is provided but also a portion where the raised parts 25a are provided are pressed in a plate thickness direction and expanded. This can reduce an expansion difference between a portion of the positive electrode core 23, 33 where the positive electrode active material layer 24, 34 is provided and the positive electrode core exposed part 22b, 32b. Therefore, the positive electrode plate 22 is restrained from curved. Accordingly, it is possible to prevent generation of wrinkles on the positive electrode core exposed part 22b, 32b at the time of compressing the positive electrode active material layer 24, 34, and also prevent occurrence of winding displacement of the positive electrode plate 22 during the winding step of the electrode assembly 20. In addition, since the raised part 25a of the protective layer 25 is at a position between a portion inside the core exposed part side end P in the width direction and the width-direction center A1, compressing the protective layer 25 so as to press the position can suppress occurrence of waviness, which is a waveform recessed-projecting deformation part in a forming part of the protective layer 25 on the positive electrode core 23.

Hereinafter, description is further given of the manufacturing method of the positive electrode plate 22 of the present disclosure, and also the manufacturing method of the positive electrode plate of comparative examples 1 to 3.

EXAMPLE

[Production of Positive Electrode Plate]

As a positive electrode active material, a positive electrode active material layer slurry was prepared by mixing lithium-containing metal composite oxides, expressed by $LiNi_{0.35}Co_{0.35}Mn_{0.30}O_2$, carbon black as a conductive material, and polyvinylidene fluoride (PVDF) as a binder in a solid mass ratio of 96:3:1. In order to form the protective layer 25, a protective layer slurry containing inorganic oxides and a binder was also prepared. The positive electrode active material layer slurry and the protective layer slurry were coated on both surfaces of the positive electrode core 33, which was made of aluminum foil with a thickness of 15 μm. After the coated films were dried, the coated films were compressed using a compression roller to produce the pre-cut positive electrode plate 32. Then, the pre-cut positive electrode plate 32 was cut at the width-direction center into a prescribed electrode size, so as to produce the positive electrode plate 22 formed with the positive electrode active material layer 24 on both the surfaces of the positive electrode core 33. In the pre-cut positive electrode plate 32, a width W1 of the positive electrode active material layer 24 (FIG. 5) was 179 mm, a width W2 of the protective layer 25 (FIG. 5) was 7.0 mm, and a width W3 of the positive electrode core exposed part 32b, including the forming part of the protective layer 25, was 15 mm. A thickness D1 of one surface side of the positive electrode active material layer 34 after compression processing was 25 μm. Furthermore, by coating the protective layer 25 as shown in FIG. 7, the raised part 25a extending in the longitudinal direction (in the front-back direction of the page of FIG. 7) were formed between a portion inside the core exposed part side end P in the width direction and the width-direction center A1 in each of the protective layers 25. After coating the protective layers 25 and before the compression processing, a distance L1 (FIG. 7(a)) from the core exposed part side end P to the raised part 25a was 2 to 3 mm. A maximum thickness D2 (FIG. 7(a)) of the protective layer 25 on one surface before the compression processing, i.e., the thickness of the protective layer up to the top of the raised part in the embodiment, was 20 μm. A thickness D3 (FIG. 7(b)) of the protective layer 25 on one surface after the compression processing was 15 μm.

Table 1 shows the width W2, the distance L1, and the thicknesses D2, D3 of the protective layer 25 on the positive electrode plate 22 or on the pre-cut positive electrode plate 32 in the manufacturing methods in the example and comparative examples 1 to 3 described later. Table 1 also shows the amount of warpage (curvature) at the width-direction center on the positive electrode plate 22 in the manufacturing methods of the example and the comparative examples 1 to 3, i.e., a thickness-direction distance from the thickness-direction center located at the center in the longitudinal direction to the thickness-direction center at one end in the longitudinal direction, and the results of the presence/absence of waviness (waviness of the protective layer) in the forming part of the protective layer 25 on the positive electrode core 23.

TABLE 1

| | Protective layer width W2 (mm) | Distance L1 from core exposed part side end to raised part of the protective layer (mm) | Maximum thickness D2 of protective layer on one surface (before compression) (μm) | Thickness D3 of protective layer on one surface (after compression) (μm) | Warpage (curvature) (mm) | Protective layer waviness |
|---|---|---|---|---|---|---|
| Example | 7.0 | 2-3 mm | 20 | 15 | 9 | Absent |
| Comparative example 1 | 7.0 | Absent | 15 | 15 | 16 | Absent |

TABLE 1-continued

| | Protective layer width W2 (mm) | Distance L1 from core exposed part side end to raised part of the protective layer (mm) | Maximum thickness D2 of protective layer on one surface (before compression) (μm) | Thickness D3 of protective layer on one surface (after compression) (μm) | Warpage (curvature) (mm) | Protective layer waviness |
|---|---|---|---|---|---|---|
| Comparative example 2 | 7.0 | 0-1 mm | 20 | 14 | 9 | Present |
| Comparative example 3 | 7.0 | 6-7 mm | 20 | 14 | 14 | Present |

Comparative Example 1

Figure 10:
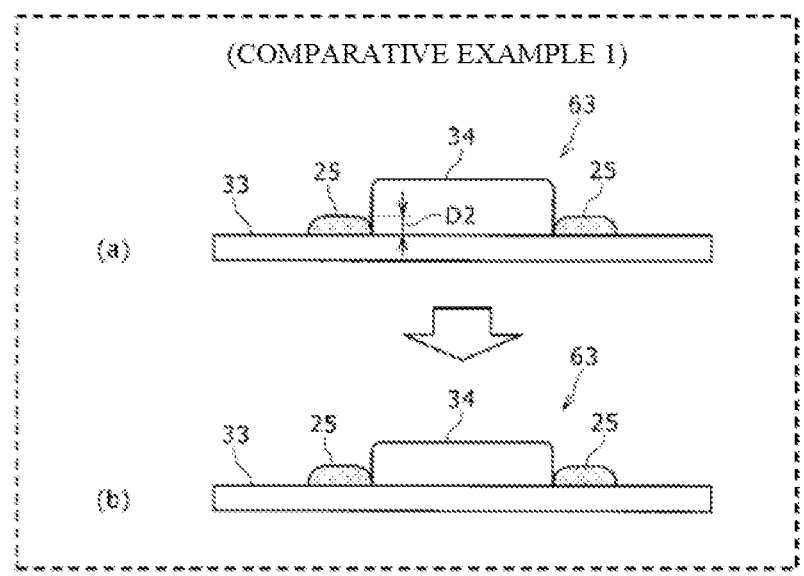
FIG. 10(a) shows the pre-cut positive electrode plate in the state after the coating and drying step and before the compressing step and corresponds to the expanded upper part of FIG. 6 in a manufacturing method of a comparative example 1.
FIG. 10(b) shows the pre-cut positive electrode plate in the state after the coating and drying step and after the compressing step and corresponds to the expanded upper part of FIG. 6 in the manufacturing method of the comparative example 1.

FIG. 10(a) shows a pre-cut positive electrode plate 63 in the state before the compressing step, and corresponds to the expanded upper part of FIG. 6 in the manufacturing method of the comparative example 1, and FIG. 10(b) shows the pre-cut positive electrode plate 63 in the state after the compressing step, and corresponds to the expanded upper part of FIG. 6 in the manufacturing method of the comparative example 1. In the comparative example 1, as shown in FIG. 10(a), at the time of coating the positive electrode active material layer 34 and the protective layers 25 in the pre-cut positive electrode plate 63, the raised part was not formed on the protective layer 25, and the thickness-direction outer surface of the protective layer 25 was a substantially flat surface. In the compressing step, only a portion provided with the positive electrode active material layer 34 was compressed by the compression roller to obtain the pre-cut positive electrode plate 63 after the compressing step as shown in FIG. 10(b). Moreover, in the comparative example 1, the maximum thickness D2 of the protective layer 25 on one surface before the compression processing was 15 μm. The positive electrode plate was produced, with other configuration aspects being the same as in the example.

Comparative Example 2

Figure 11:
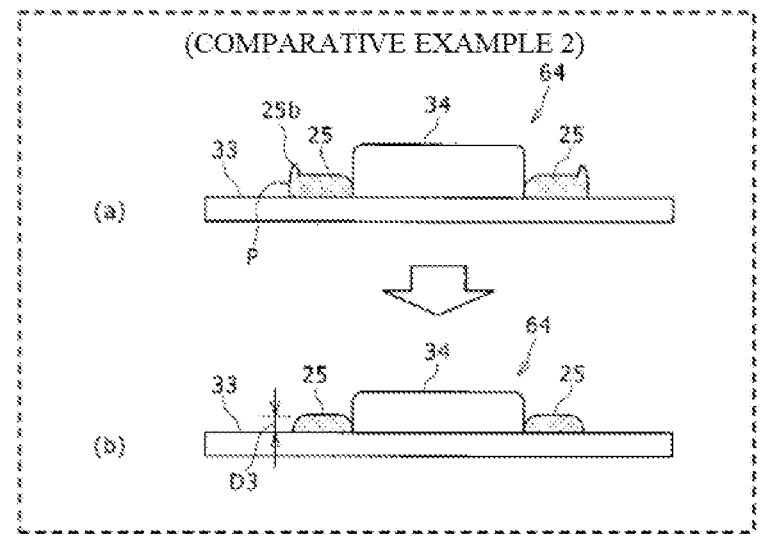
FIG. 11(a) shows the pre-cut positive electrode plate in the state after the coating and drying step and before the compressing step and corresponds to the expanded upper part of FIG. 6 in the manufacturing method of a comparative example 2.
FIG. 11(b) shows the pre-cut positive electrode plate in the state after the coating and drying step and after the compressing step and corresponds to the expanded upper part of FIG. 6 in a manufacturing method of the comparative example 2.

FIG. 11(a) shows a pre-cut positive electrode plate 64 in the state before the compressing step, and corresponds to the expanded upper part of FIG. 6 in the manufacturing method of the comparative example 2, and FIG. 11(b) shows the pre-cut positive electrode plate 64 in the state after the compressing step, and corresponds to the expanded upper part of FIG. 6 in the manufacturing method of the comparative example 2. In the comparative example 2, as shown in FIG. 11(a), at the time of coating the positive electrode active material layer 34 and the protective layer 25 in the pre-cut positive electrode plate 64, raised parts 25b continuously extending from the core exposed part side end P in the longitudinal direction (in the front-back direction of the page of FIG. 11) were formed in the vicinity of the core exposed part side end P on the protective layers 25. In the compressing step, the protective layers 25 and the positive electrode active material layer 34 were compressed by the compression roller so as to press the raised parts 25b and the positive electrode active material layer 34. As a result, the pre-cut positive electrode plate 64 after the compressing step was obtained as shown in FIG. 11(b). In the comparative example 2, after coating the protective layer 25 and before the compression processing, the distance L1 from the core exposed part side end P to the raised part 25b was 0 mm to 1 mm. The thickness D3 of the protective layer 25 on one surface after the compression processing was 14 μm. The positive electrode plate was produced, with other configuration aspects being the same as in the example.

Comparative Example 3

Figure 12:
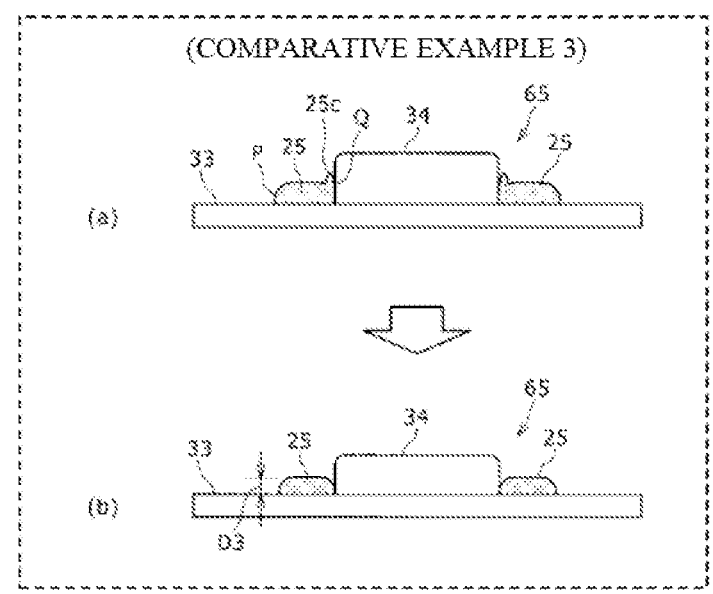
FIG. 12(a) shows the pre-cut positive electrode plate in the state after the coating and drying step and before the compressing step and corresponds to the expanded upper part of FIG. 6 in a manufacturing method of a comparative example 3.
FIG. 12(b) shows the pre-cut positive electrode plate in the state after the coating and drying step and after the compressing step and corresponds to the expanded upper part of FIG. 6 in the manufacturing method of the comparative example 3.

FIG. 12(a) shows a pre-cut positive electrode plate 65 in the state before the compressing step, and corresponds to the expanded upper part of FIG. 6 in the manufacturing method of the comparative example 3, and FIG. 12(b) shows a pre-cut positive electrode plate 65 in the state after the compressing step, and corresponds to the expanded upper part of FIG. 6 in the manufacturing method of the comparative example 3. In the comparative example 3, as shown in FIG. 12(a), at the time of coating the positive electrode active material layer 34 and the protective layers 25 in the pre-cut positive electrode plate 65, raised parts 25c continuously extending from a positive electrode active material layer side end Q in the longitudinal direction (in the front-back direction of the page of FIG. 12) were formed in the vicinity of the positive electrode active material layer side end Q on the protective layers 25. In the compressing step, the protective layers 25 and the positive electrode active material layer 34 were compressed by the compression roller so as to press the raised parts 25c and the positive electrode active material layer 34. As a result, the pre-cut positive electrode plate 65 after the compressing step was obtained as shown in FIG. 12(b). In the comparative example 3, after coating the protective layers 25 and before the compression processing, the distance L1 from the core exposed part side end P to the raised part 25c was 6 mm to 7 mm. The thickness D3 of the protective layer 25 on one surface after the compression processing was 14 μm. The positive electrode plate was produced, with other configuration aspects being the same as in the example.

[Evaluation Method and Evaluation Results]

Evaluation was made as to the amount of warpage (curvature) and the presence/absence of waviness in the protective layer 25, in the positive electrode plates with a constant length manufactured by four different manufacturing methods according to the example and the comparative examples 1 to 3. Based on the evaluation results shown in Table 1, the amount of warpage was reduced to 9 mm in the example. In the example, no waviness was found in the forming part of the protective layer 25 on the positive electrode core 33. These results indicate that the reduced warpage or the waviness not found makes it difficult to cause winding displacement of the positive electrode plate at the time of forming a winding type electrode assembly.

On the other hand, in the comparative example 1, the amount of warpage was increased to 16 mm, as shown in Table 1. This is considered to be because in the comparative example 1, the raised parts were not formed on the protective layer 25 and therefore the protective layers 25 were not compressed, which increased an expansion difference between a portion of the positive electrode core 33 where the positive electrode active material layer 34 was provided and a portion where the protective layer 25 was provided. On the other hand, since the protective layer 25 was not compressed in the comparative example 1, waviness in the forming part of the protective layer 25 on the positive electrode core 33 was not found as shown in Table 1.

Figure 13A:
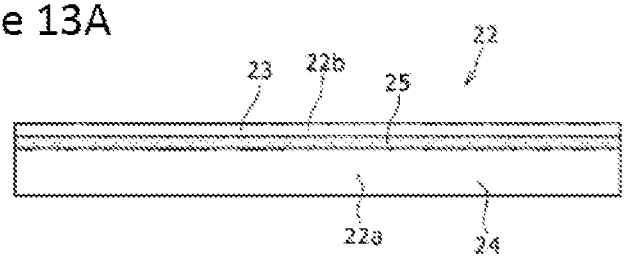
FIG. 13A is a schematic diagram showing the positive electrode plate manufactured by the manufacturing method of the embodiment in a state after a cutting step.
Figure 13B:
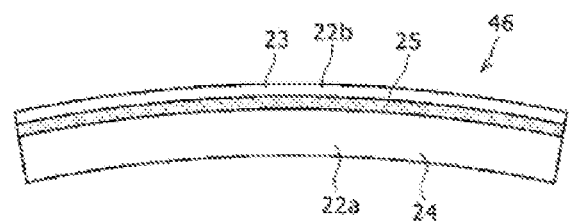
FIG. 13B is a schematic diagram showing the positive electrode plate manufactured by the manufacturing method of the comparative example 1 in the state after the cutting step.

FIG. 13A is a schematic diagram showing the positive electrode plate 22 manufactured by the manufacturing method of the embodiment in the state after the cutting step. FIG. 13B is a schematic diagram showing the positive electrode plate 46 manufactured by the manufacturing method of the comparative example 1 in the state after the cutting step. In the manufacturing method of the embodiment, as shown in FIG. 13A, in the positive electrode plate 22, the expansion difference between the portion provided with the positive electrode active material layer 24 and the portion provided with the protective layer 25, caused by the compressing step, could be reduced. This made it possible to reduce a difference in length in the longitudinal direction (the right-left direction in FIG. 13A) between both the ends of the positive electrode plate 22 in the width direction (the up-down direction in FIG. 13A). Hence, the shape of the positive electrode plate 22 as viewed from one end side in the thickness direction (the front side of the page of FIG. 13A) could be a long-length rectangular shape with high shape accuracy. Therefore, it was found that the winding displacement of the positive electrode plate 22 could be prevented in the case of forming the winding type electrode assembly 20 including the positive electrode plate 22.

On the other hand, in the manufacturing method of the comparative example 1 as shown in FIG. 13B, in the positive electrode plate 46, the expansion difference between a portion provided with the positive electrode active material layer 24 and a portion provided with the protective layer 25, caused by the compressing step, increased so that the portion provided with the positive electrode active material layer 24 was expanded more than the portion provided with the protective layer 25. With this elongation, the difference in length in the longitudinal direction (the right-left direction in FIG. 13B) increased at both the ends of the positive electrode plate 46 in the width direction (the up-down direction in FIG. 13B). As a result, the shape of the positive electrode plate 46 as viewed from one end side in the thickness direction was deformed, as if being bent, from a long-length rectangular shape to a substantially arc shape with the positive electrode active material layer 24 being on the inside. FIG. 13B shows the bending of the positive electrode plate 46 with exaggeration. With the deformation of the positive electrode plate 46 as shown above, the winding displacement of the positive electrode plate 46 in the case of forming the winding type electrode assembly 20 including the positive electrode plate 46 easily occurred.

Furthermore, in the comparative example 2, the raised parts 25b of the protective layers 25 were compressed, which reduced an expansion difference between a portion of the positive electrode core 33 where the positive electrode active material layer 34 was provided and a portion where the protective layer 25 was provided. As a result, the amount of warpage was reduced to 9 mm as shown in Table 1. Meanwhile, in the comparative example 2, waviness occurred in a portion of the forming part of the protective layer 25 on the positive electrode core 33 in the vicinity of the core exposed part side end P. This is considered to be because the raised part 25b of the protective layer 25 was continuous from the core exposed part side end P of the protective layer 25, so that in the compressing step, the positive electrode core 33 was pressed at the forming part of the protective layer 25 in the vicinity of the core exposed part side end P. More specifically, since there is a large difference between the thickness of the protective layer 25 in the vicinity of the core exposed part side end P including the raised part 25b and the thickness of the positive electrode core 33, it is considered that the expansion difference between both the sides of the positive electrode core 33 with the core exposed part side end P as a boundary increases when the protective layer 25 on the positive electrode core 33 in the vicinity of the core exposed part side end P is pressed. Thus, it is considered that waviness occurred in the vicinity of the core exposed part side end P on the positive electrode core 33.

In the comparative example 3, as in the comparative example 2, the raised parts 25c of the protective layers 25 were compressed. However, unlike the comparative example 2, the raised parts 25c were adjacent to the positive electrode active material layer 34. As a result, in the comparative example 3, there was an increased expansion difference between a portion of the positive electrode core 33 where the positive electrode active material layer 34 was provided and a portion where a portion of the protective layer 25 distanced from the positive electrode active material layer 34 outward in the width direction was arranged. Therefore, the amount of warpage was increased to 14 mm, as shown in Table 1. Moreover, in the comparative example 3, waviness occurred in the vicinity of a boundary between the forming part of the protective layer 25 on the positive electrode core 33 and the forming part of the positive electrode active material layer 34. This is considered to be because the raised part 25c of the protective layer 25 was continuous from the positive electrode active material layer side end Q, and in the compressing step, the positive electrode core 33 was pressed at two positions: the position of a portion provided with the positive electrode active material layer 34; and a position of a portion where the raised parts 25c were provided. More specifically, since there was a large difference between the thickness of the protective layer 25 at the core exposed part side end P including the raised part 25b and the thickness of the positive electrode active material layer 34, it is considered that the expansion difference, between both the sides of a boundary part that is between the protective layer 25 and the positive electrode active material layer 34 on the positive electrode core 33, increased when the protective layers 25 on the positive electrode core 33 in the vicinity of the positive electrode active material layer side ends Q and the forming part of the positive electrode active material layer 34 were pressed. Thus, it is considered that waviness occurred in the vicinity of the boundary part.

In the embodiment disclosed, the positive electrode plate 22 in which the positive electrode active material layer 24 is formed on both the surfaces of the positive electrode core 23 has been described. However, the positive electrode plate manufactured by the manufacturing method of the present disclosure is not limited to such configuration, and the positive electrode plate may be configured such that the positive electrode active material layer is formed only on one surface of the positive electrode core.

REFERENCE SIGNS LIST

10 Non-aqueous electrolyte secondary battery (secondary battery)
12 Outer casing
14 Seal plate
15 Positive electrode terminal
16 Negative electrode terminal
20 Electrode assembly
22 Positive electrode plate 22a Body part
22b Positive electrode core exposed part
23 Positive electrode core
24 Positive electrode active material layer
25 Protective layer
25a to 25c Raised part
26 Negative electrode plate
26a Body part
26b Negative electrode core exposed part
27 Negative electrode core
28 Negative electrode active material layer
30, 31 Separator
32 Pre-cut positive electrode plate
32a Body part
32b Positive electrode core exposed part
33 Positive electrode core
34 Positive electrode active material layer
40 Press machine
41 compression roller
42 Intermediate pressing part
43 End pressing part
46 Positive electrode plate
47 Positive electrode current collector
48 Positive electrode receiving member
50 Negative electrode current collector
58 Negative electrode receiving member
60 Insulating tape
61 First insulating member
62 Second insulating member
63 to 65 Pre-cut positive electrode plate

The invention claimed is:

1. A manufacturing method of a positive electrode plate for a non-aqueous electrolyte secondary battery having a body part that has a positive electrode active material layer formed on a positive electrode core, and a core exposed part that has the positive electrode core exposed without the positive electrode active material layer formed on the positive electrode core, the positive electrode plate for a non-aqueous electrolyte secondary battery having a protective layer formed in a region of the core exposed part that is adjacent to the positive electrode active material layer, the manufacturing method comprising:

a coating and drying step of coating the positive electrode active material layer and the protective layer onto the positive electrode core to form the protective layer in such a manner that a raised part is formed on a top surface of the protective layer between a portion inside a side end of the core exposed part in a width direction and a width-direction center, and then drying the positive electrode active material layer and the protective layer, wherein the protective layer recedes from the raised part in both an end of the protective layer in the width direction and the width-direction center, wherein the raised part is located on an end of the protective layer toward the side end of the core exposed part in the width direction and is higher than both the end of the protective layer and the width-direction center; and a compressing step of compressing the protective layer and the positive electrode active material layer so as to press the raised part formed in the coating and drying step and the positive electrode active material layer.

2. The manufacturing method of the positive electrode plate for a non-aqueous electrolyte secondary battery according to claim 1, wherein the coating and drying step and the compressing step are performed with the core exposed part arranged on each of both end sides of the body part, the manufacturing method further comprising, after the compressing step, a cutting step of cutting the center of the body part in the width direction to form two positive electrode plates for a non-aqueous electrolyte secondary battery.

3. The manufacturing method of the positive electrode plate for a non-aqueous electrolyte secondary battery according to claim 1, wherein the protective layer is thinner than the positive electrode active material layer.

4. A manufacturing method of a non-aqueous electrolyte secondary battery, comprising:

an electrode assembly producing step of producing an electrode assembly including the positive electrode plate for a non-aqueous electrolyte secondary battery manufactured by the manufacturing method according to claim 1, a negative electrode plate, and a separator; and an arranging step of arranging the electrode assembly and a non-aqueous electrolyte in an outer casing.

* * * * *